United States Patent [19]
Schluderberg

[11] Patent Number: 4,619,809
[45] Date of Patent: Oct. 28, 1986

[54] STEAM GENERATION AND REHEAT APPARATUS

[75] Inventor: Donald C. Schluderberg, Lynchburg, Va.

[73] Assignee: The Babcock & Wilcox Company, New Orleans, La.

[21] Appl. No.: 480,450

[22] Filed: Mar. 30, 1983

[51] Int. Cl.$^4$ .............................................. G21D 1/00
[52] U.S. Cl. ..................................... 376/402; 60/670; 60/679
[58] Field of Search .................... 60/652, 670, 679; 122/32, 406 R, 406 S, 412, 451 R; 376/146, 211, 378, 379, 391, 392, 393, 394, 402

[56] References Cited

U.S. PATENT DOCUMENTS

| | | | |
|---|---|---|---|
| 4,164,849 | 8/1979 | Mangus | 376/402 |
| 4,367,193 | 1/1983 | Bussard | 376/146 |

Primary Examiner—Deborah L. Kyle
Assistant Examiner—Richard W. Wendtland
Attorney, Agent, or Firm—Robert J. Edwards; James C. Simmons; D. Neil LaHaye

[57] ABSTRACT

Steam generation and reheat apparatus and method. After flowing in series through a superheater and an evaporator, a heat supply fluid is flowed through both an economizer and a reheater in parallel flow to improve the Rankine Cycle thermal efficiency in plants such as nuclear power plants where the heat supply fluid temperatures are limited.

17 Claims, 3 Drawing Figures

STEAM GENERATION AND REHEAT APPARATUS

This invention relates generally to steam generation and reheat apparatus. More particularly, this invention relates to steam generation and reheat apparatus wherein a heat supply fluid is flowed in heat exchange relation with water and steam to provide superheated steam for delivery to a heat engine and to reheat exhaust steam from a higher pressure heat engine to an acceptable quality for delivery to a lower pressure heat engine. As used herein, the term "quality" refers to the weight fraction or percentage of steam in a mixture of steam and water, and further refers to the number of degrees of superheat in superheated steam.

Pressurized water nuclear reactor plants typically employ a steam generation cycle wherein a first fluid commonly known as coolant is flowed in heat exchange relation with fuel rod bundles in the reactor core, and the heated coolant is then flowed through a heat exchanger commonly known as a steam generator in heat exchange relation with feedwater flowing through the steam generator to heat the feedwater and produce superheated steam. In such a once through steam generator, the pre-heater, evaporator, and superheater do not exist as separate units but are merged into a single tube bundle, and the functions of pre-heating, evaporating, and superheating occur at the lower, middle, and upper portions respectively of the tube bundle as the feed water and generated steam flow upwardly therethrough. Exhaust from the high pressure turbine may also be flowed in heat exchange relation with the coolant to reheat the steam to an acceptable quality for delivery to a lower pressure turbine.

In U.S. Pat. No. 4,164,849 to Mangus, the coolant from a fast breeder reactor is liquid sodium. This coolant flows in parallel flow through a superheater and a reheater afterwhich it is flowed in series through an evaporator and a preheater and returned to the reactor core in a manner typical of reheat cycles in the nuclear reactor industry.

In power producing nuclear reactor systems such as pressurized water reactors, fast breeder reactors, and fusion power reactors, the steam temperatures are limited by the temperature of the heat supply fluid (coolant) and the range of temperatures of the heat supply fluid during exchange of its heat to the steam and water. It is commonly known to those of ordinary skill in the art to which this invention pertains that to improve the Rankine cycle thermal efficiency, the water may be heated, evaporated, and superheated at an increased average temperature. Thus, it is desirable to evaporate the water at the highest possible pressure thereby evaporating the water at the highest possible temperature in order to provide such improved Rankine cycle thermal efficiency. However, raising steam pressure leads to what are characteristically called "pinch point $\Delta T$ problems". As the steam pressures and the corresponding evaporation temperatures are raised, this $\Delta T$ (the temperature difference between the heat exchange fluids at a particular point in the cycle) becomes too small to maintain adequate log mean temperature differences in the economizer and evaporator sections of the steam generator for effective heat transfer.

Because of such temperature limitations, difficulties have been experienced in designing of fusion power reactors using organic fluid coolants which can provide adequate Rankine cycle thermal efficiencies.

It is therefore an object of the present invention to improve the Rankine cycle thermal efficiency of a steam generation and reheat apparatus by increasing the pressure and temperature at which water is evaporated to form steam for a given heat supply fluid having a given temperature range over which it is flowed in heat exchange relation with the steam and water.

It is a further object of the present invention to improve the Rankine cycle thermal efficiency of a fusion power system.

It is yet another object of the present invention to improve the Rankine cycle thermal efficiencies of pressurized water reactors and sodium or organic fluid cooled fast breeder reactors.

The various features of novelty which characterize the invention are pointed out with particularity in the claims annexed to and forming a part of this disclosure. For a better understanding of the invention, its operating advantages, and specific objects obtained by its uses, reference is made to the accompanying drawings and descriptive matter in which a preferred embodiment of the invention is illustrated.

IN THE DRAWINGS

Figure 1:
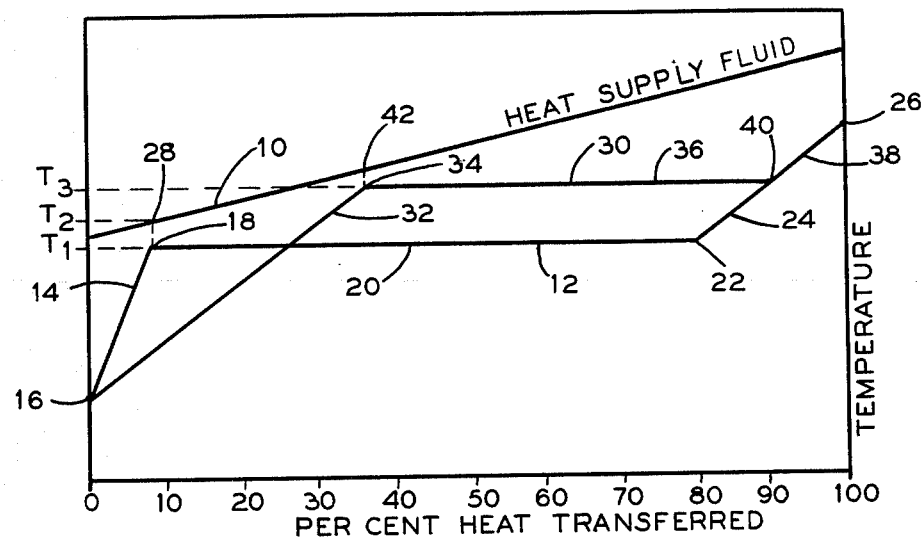
FIG. 1 is a temperature and heat transfer graph illustrating the advantages to be achieved by the present invention as compared to a conventional steam and water cycle.

Referring to FIG. 1, there is shown, for the purposes of illustrating the advantages to be achieved by the present invention, a graph of temperature as related to the percent of heat transferred for steam generation apparatus wherein temperature increases toward the top of the graph. At 10 is illustrated the graph of a range of temperatures from a high temperature at the right hand side thereof to a low temperature at the left hand side thereof over which a heat supply fluid supplies heat to steam and water to provide superheated steam to steam turbines. It should be noticed that the heat supply fluid graph is a straight line which slopes upwardly as it extends to the right. These temperatures of the heat supply fluid limit the temperature at which feed water can be evaporated to form steam. Line 12 is illustrative of a typical steam and water cycle wherein the water is preheated in the upwardly sloping line segment 14 between points 16 and 18, then evaporated to form steam at constant temperature over the line segment 20 between point 18 and point 22, and the saturated steam is then superheated in the upwardly sloping line segment 24 between point 22 and point 26. The temperature $T_1$ at line segment 20 at which the water is evaporated to form saturated steam is limited by the temperature $T_2$ at point 28 of the heat supply fluid at which evaporation of the feed water begins. The point 28 may be therefore characterized as a "pinch point". The temperature difference $T_2 - T_1$ may be characterized as the "pinch point $\Delta T$". It can thus be seen that the amount of heat transferable from the heat supply fluid to the water or steam is directly related to the pressure and the amount of time that the fluids are in heat exchange relationship.

Since the heat supply fluid temperature line 10 slopes upwardly to the right in the graph, it is therefore apparent that if the pinch point could be moved to the right, then the temperature at which evaporation occurs could be increased. This is illustrated by line 30 wherein preheating of the water occurs in the line segment 32 between point 16 and point 34, evaporation of the water to form saturated steam occurs at constant temperature over the line segment 36 between point 34 and point 40, and superheating of the saturated steam occurs in the line segment 38 between point 40 and point 26. This steam and water cycle results in a pinch point at point 42 which allows evaporation at temperature $T_3$ which is higher than temperature $T_1$. It being an object of the present invention to achieve such a higher temperature $T_3$ at which the water is evaporated to form saturated steam within the confines of the heat supply fluid temperature limitations, a preferred embodiment of an apparatus for achieving such a higher temperature will now be described.

Figure 2:
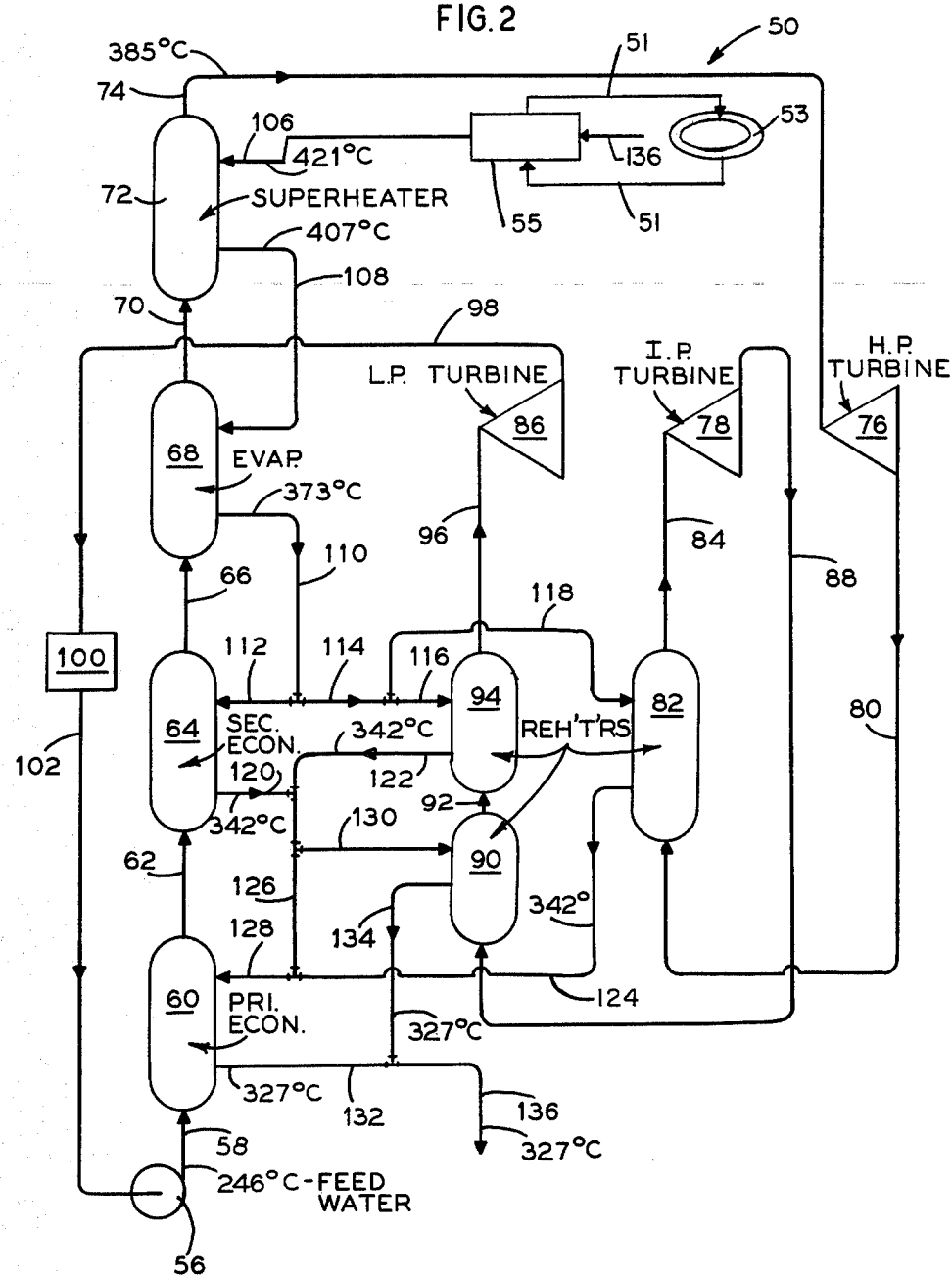
FIG. 2 is a schematic of a steam generation and reheat apparatus for a fusion power reactor embodying the present invention.

Referring to FIG. 2, there is schematically illustrated at 50 a proposed steam generation and reheat apparatus for a fusion power plant. In such a plant, an intermediate lithium lead fluid flowing through lines 51 may be used to remove thermal energy from the reactor core or blanket illustrated at 53 as well as to absorb neutrons and thereby make tritium fuel. Although most of the tritium is thereafter separated from the lithium lead for use as fuel, some of the tritium may diffuse through the tubular walls. In order to prevent the small amounts of tritium which diffuse through the various tubular walls from escaping the containment portions of the plant, an organic material is used to remove the heat from the lithium lead for use as a heat supply fluid to a steam and water cycle as well as to capture the tritium that may diffuse through the walls of tubes carrying the lithium lead. The organic fluid used to remove thermal energy from the lithium lead is preferably one such as, for example, a polyphenyl which degrades at temperatures higher than the temperatures which would typically be encountered by the fluid. However, any suitable heat supply fluid is meant to come within the scope of the present invention. After having received thermal energy from the lithium lead in heat exchange means illustrated schematically at 55, the organic fluid, in accordance with the specific embodiment of the apparatus illustrated, is at a temperature of 421° Centigrade (790° Fahrenheit). After flowing through the steam generation and reheat apparatus 50 and imparting thermal energy to water and steam for generation and reheating of steam, the organic fluid is cooled to a temperature of 327° Centigrade (620° Fahrenheit). The temperature curve for this range of temperatures for the organic fluid is illustrated by the upwardly sloping line 52 in FIG. 3. The corresponding range of temperatures for the lithium lead is shown by the correspondingly upwardly sloping line 54.

Referring back to FIG. 2, feedwater is supplied by means such as feed pump 56 through line 58 to a first economizer 60 at a temperature of 246° Centigrade (475° Fahrenheit) and then through line 62 to second economizer 64 wherein the water is preheated and delivered through line 66 to evaporator 68 wherein the water is further heated and thereby evaporated to form saturated steam at a constant temperature of 205° Centigrade (401° Fahrenheit) and a pressure of 17.2 Mpa. In the evaporator 68, saturated steam is separated from the water and is directed through line 70 to superheater 72 where additional thermal energy is imparted to the saturated steam to thereby superheat it to a temperature of 385° Centigrade (725° Fahrenheit) and pressure of 16.55 Mpa (2400 psia). The superheated steam is then delivered through line 74 to a high pressure heat engine such as high pressure turbine 76 where it is expanded to perform work as it passes through the turbine. In order to improve the quality of the high pressure turbine exhaust steam for its delivery to a lower pressure heat engine such as intermediate pressure turbine 78, the exhaust therefrom in saturated condition and at a pressure of 6.70 Mpa (1000 psia) is delivered through line 80 to a first reheater means such as reheater 82 wherein additional thermal energy is imparted to the steam so that it has a quality (superheated steam at a temperature of 343° Centigrade (650° Fahrenheit) and pressure of 6.9 Mpa (1000 psia)) satisfactory for delivery through line 84 to the intermediate pressure turbine 78 where it is again expanded to perform additional work. In order to improve the quality of the intermediate pressure turbine exhaust steam in like manner for its delivery to a still lower pressure heat engine such as low pressure turbine 86, the exhaust from the intermediate pressure turbine 78 in saturated condition and at a pressure of 1.72 Mpa 250 psia) is delivered through line 88 to a second reheater means such as first stage reheater 90, line 92, and second stage reheater 94 where additional thermal energy is imparted to the steam so that it has a quality (a temperature of 343° Centigrade (650° Fahrenheit) and a pressure of 1.72 Mpa (250 psia) satisfactory for delivery through line 96 to low pressure turbine 86 where the steam is again expanded to perform additional work. The steam exhausted from the low pressure turbine 86 may be delivered through line 98 to a condenser 100 wherein it is condensed and delivered through line 102 and various suitable feedwater heating and treatment apparatus (not shown) back to the feed pump 56 and the cycle is repeated.

In order to increase the temperature at which the water is evaporated in the evaporator 68 to form saturated steam for increased Rankine cycle thermal efficiency over the temperature and corresponding efficiency found in a conventional steam cycle such as where the organic fluid is divided in parallel flow to reheaters and superheater for imparting thermal energy thereto afterwhich it is flowed in series to an evaporator and economizer, in accordance with the present invention, the organic fluid imparts thermal energy to both the feedwater in the first and second economizers 60 and 64 respectively and the exhaust steam in the reheaters 82, 90, and 94 after it has flowed through the superheater 72 and the evaporator 68 to thus advantageously provide for a greater percentage of available thermal energy to be transferred from the organic fluid after it has passed through the evaporator 68 and superheater 72. In order to provide such organic fluid flow in accordance with the present invention, the evaporator 68, superheater 72, and economizer means 60 and 64 are separated each from the other as shown in FIG. 2. As mentioned earlier, the separation of economizers 60 and 64, evaporator 68 and superheater 72 allow for the desirable evaporation of water at the highest possible pressure and temperature by individual pressure control in each of the units. Thus, the "pinch point", illustrated at 104 in FIG. 3, is moved to the right and to a greater constant temperature than would be found in the typical conventional steam generation and reheat apparatus using a polyphenyl at the temperatures indicated as the heat supply fluid.

Referring back to FIG. 2, the organic fluid is supplied through line 106 to the superheater 72 at a temperature of 421° Centigrade (790° Fahrenheit) wherein it is flowed through the superheater 72 in heat exchange relation with the saturated steam from the evaporator 68 to form superheated steam. The organic fluid is exited from the superheater 72 through line 108 at a temperature of 407° Centigrade (765° Fahrenheit) and is delivered in series flow to the evaporator 68 where it is flowed in heat exchange relation with the pre-heated feedwater to evaporate the feedwater and form saturated steam. The organic fluid, after imparting some of its available thermal energy to the water in the evaporator 68, leaves the evaporator through line 110 at a temperature of 373° Centigrade (703° Fahrenheit). In accordance with the present invention, the organic fluid is then flowed in heat exchange relation with the feed water and turbine exhaust steam in parallel flow through the reheat means comprising reheaters 82, 90, and 94, and the economizer means comprising the first and second economizers 60 and 64 respectively. A portion of the organic fluid is flowed through line 112 to the second economizer 64. The remainder of the organic fluid flows through line 114 and then, in order to provide an even greater Rankine cycle thermal efficiency, it is flowed in parallel through line 116 to the second reheater second stage 94 and through line 118 to the first reheater 82. The organic fluid exits the second economizer, the second reheater second stage, and the first reheater through lines 120, 122, and 124 respectively each at a temperature of 342° Centigrade (648° Fahrenheit) and are rejoined at common line 126. The organic fluid is again flowed in parallel through line 128 to the first economizer 60 and through line 130 to the second reheater first stage 90. The organic fluid exits the first economizer and the second reheater first stage through lines 132 and 134 respectively, each at a temperature of 327° Centigrade (620° Fahrenheit). Lines 132 and 134 join into common line 136 and the organic fluid is routed back through line 136 into heat exchange relation with the lithium lead fluid to again receive thermal energy therefrom so that it may again be flowed through the superheater 72 through line 106, and the cycle is repeated.

It should be noted that any number of suitable economizers and any number of suitable reheaters or reheater stages is meant to come within the scope of the present invention. In addition, any suitable heat supply fluid is meant to come within the scope of the present invention such as, for example, liquid sodium, other organic fluids, liquid metal, and oil. Various suitable valves and instruments (not shown) for flow control may be placed in the lines in accordance with engineering principles of common knowledge to those of ordinary skill in the art to which this invention pertains.

Figure 3:
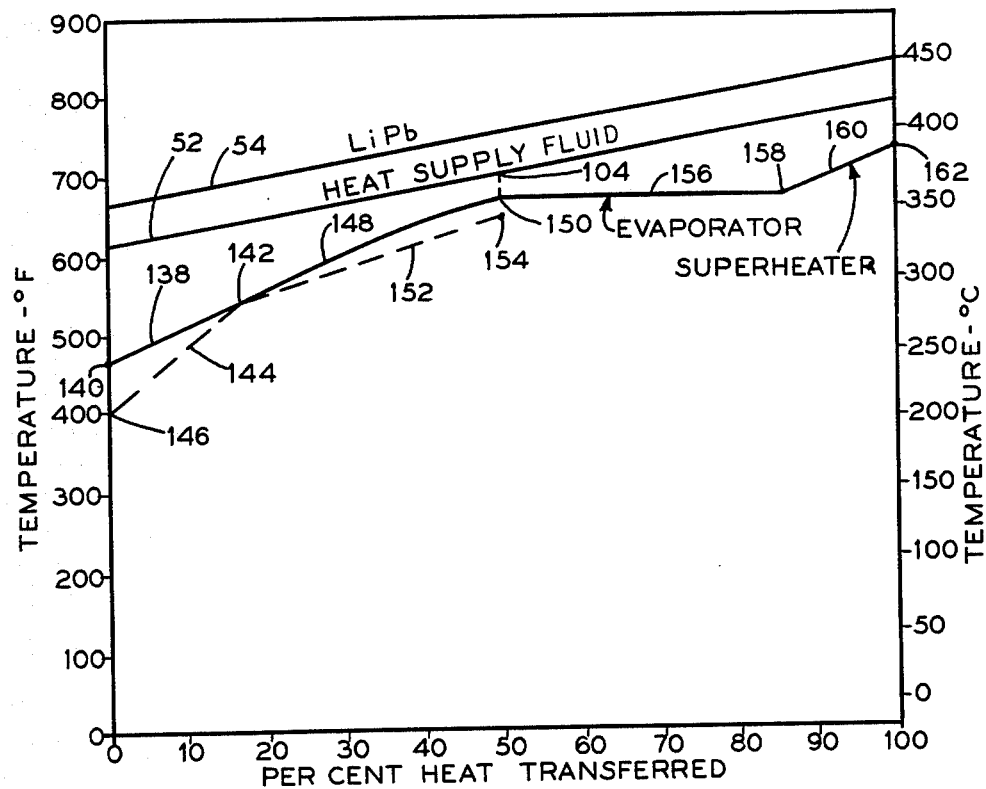
FIG. 3 is a temperature and heat transfer graph for the apparatus illustrated in FIG. 2.

The advantageously higher temperature for evaporation of the water to form saturated steam is illustrated in FIG. 3. The pre-heating of the feedwater in the first economizer 60 is illustrated by line segment 138 between points 140 and 142, and the reheating of exhaust steam from the intermediate pressure turbine 78 in the second reheater first stage 90 is illustrated by dashed line segment 144 between points 146 and 142. Further pre-heating of the feedwater in the second economizer 64 is illustrated by line segment 148 between points 142 and 150, and further reheating of the exhaust steam from the intermediate pressure turbine 78 in the second reheater second stage 94 as well as the reheating of the exhaust steam from the high pressure turbine 76 in the first reheater 82 is illustrated by the dashed line segment 152 between points 142 and 154. Point 104 is the "pinch point" which represents the limit of the temperature at which the water may be evaporated to form saturated steam. In this case, the constant temperature line segment 156 between points 150 and 158 illustrate the evaporation of the water to form saturated steam in the evaporator 68. The line segment 160 between points 158 and 162 represents the superheating of the saturated steam in the superheater 72. It should be noted that approximately 50% of the available thermal energy in the organic fluid is utilized to preheat the feedwater and to reheat the steam exhausted from the high pressure and intermediate pressure turbines. If the organic fluid were, in accordance with conventional practice, flowed in parallel to the superheater and reheaters to reheat the exhaust steam and to superheat the saturated steam before being flowed to the evaporator and economizers, then substantially less than 50% of the available thermal energy of the organic fluid would be used to merely preheat the water in which case the "pinch point" 104 would be moved to the left in the graph and the temperature at which evaporation of the water could occur would be reduced substantially. Thus, the steam generation and reheat apparatus 50 of the present invention is provided to increase the temperature at which the water is evaporated to form saturated steam for greater Rankine cycle thermal efficiency.

In accordance with a method of the present invention, steam is generated and reheated by flowing an heat supply fluid in heat exchange relation with saturated steam to provide superheated steam, then the heat supply fluid is flowed in heat exchange relation with water to form saturated steam, then the heat supply fluid is flowed in parallel flow in heat exchange relation with water to pre-heat the water for delivery to the evaporator and with steam exhausted from a heat engine to reheat the steam for delivery to a lower pressure heat engine.

Certain features of this invention may sometimes be used to advantage without corresponding use of the other features. While specific embodiments of the invention have been shown and described in detail to illustrate the application of the principles of the invention, it will be understood that the invention may be embodied otherwise without departing from such principles.

I claim:
1. Steam generation and reheat apparatus comprising:
   a. means for evaporating water to form saturated steam;
   b. means for superheating the saturated steam for delivery to a heat engine;
   c. at least one means for reheating exhaust steam from a heat engine for delivery to a lower pressure heat engine;
   d. economizer means for pre-heating water before delivery of the water to said evaporator means;
   e. means for flowing an heat supply fluid in heat exchange relation with the water an steam in series flow through said superheated means and said evaporator means; and
   f. means for flowing the heat supply fluid, after its exit from said evaporator means, in heat exchange relation with the water and exhaust steam in parallel flow through said reheat means and said economizer means; and g. means for imparting thermal energy to the heat supply fluid.

2. Apparatus according to claim 1 wherein the source of said thermal energy comprises a nuclear reaction.

3. Apparatus according to claim 2 wherein said reheat means comprises means for reheating exhaust steam from a high pressure steam turbine for delivery to an intermediate pressure steam turbine, and means including a first stage reheater and a second stage reheater for reheating exhaust steam from said intermediate pressure steam turbine for delivery to a low pressure steam turbine; said economizer means includes a primary economizer and a secondary economizer; said parallel flow means comprises means for flowing the heat supply fluid in parallel through said secondary economizer, said second stage reheater, and said high pressure steam turbine exhaust reheating means; said parallel flow means further comprises flowing the heat supply fluid from said secondary economizer, said second stage reheater, and said high pressure steam turbine exhaust reheating means in parallel through said primary economizer and said first stage reheater.

4. Apparatus according to claim 2 wherein said evaporator means, said superheated means, and said economizer means are separated each from the other, a conduit means interconnects said economizer means with said evaporator means for delivery of pre-heated feedwater to said evaporator means, and a conduit means interconnects said evaporator means with said superheater means for delivery of saturated steam to said superheater means.

5. Apparatus according to claim 1 wherein said thermal energy imparting means comprises means for imparting thermal energy to an intermediate tritium producing fluid, and means for imparting thermal energy from the intermediate fluid to the heat supply fluid which heat supply fluid is of a type which captures tritium to prevent its escape from containment portions of a fusion reactor plant.

6. Apparatus according to claim 5 wherein the heat supply fluid is an organic fluid.

7. Apparatus according to claim 5 wherein the heat supply fluid is polyphenyl and the intermediate fluid is lithium lead.

8. Apparatus according to claim 7 wherein said reheat means comprises means for reheating exhaust steam from a high pressure steam turbine for delivery to an intermediate pressure steam turbine, and means including a first stage reheater and a second stage reheater for reheating exhaust steam from said intermediate pressure steam turbine for delivery to a low pressure steam turbine; said economizer means includes a primary economizer and a secondary economizer; said parallel flow means comprises means for flowing the heat supply fluid in parallel through said secondary economizer, said second stage reheater, and said high pressure steam turbine exhaust reheating means; said parallel flow means further comprises flowing the heat supply fluid from said secondary economizer, said second stage reheater, and said high pressure steam turbine exhaust reheating means in parallel through said primary economizer and said first stage reheater.

9. Apparatus according to claim 8 wherein said evaporator means, said superheater means, and said economizer means are separated each from the other, a conduit means interconnects said economizer means with said evaporator means for delivery of pre-heated feedwater to said evaporator means, and a conduit means interconnects said evaporator means with said superheater means for delivery of saturated steam to said superheater means.

10. Apparatus according to claim 1 wherein said reheat means comprises means for reheating exhaust steam from a high pressure steam turbine for delivery to an intermediate pressure steam turbine, and means including a first stage reheater and a second stage reheater for reheating exhaust steam from said intermediate pressure turbine for delivery to a low pressure steam turbine; said economizer means includes a primary economizer and a secondary economizer; said parallel flow means comprises means for flowing the heat supply fluid in parallel through said secondary economizer, said second stage reheater, and said high pressure steam turbine exhaust reheating means; said parallel flow means further comprises flowing the heat supply fluid from said secondary economizer, said second stage reheater, and said high pressure steam turbine exhaust reheating means in parallel through said primary economizer and said first stage reheater.

11. Apparatus according to claim 10 wherein said evaporator means, said superheater means, and said economizer means are separated each from the other, a conduit means interconnects said economizer means with said evaporator means for delivery of pre-heated feedwater to said evaporator means, and a conduit means interconnects said evaporator means with said superheater means for delivery of saturated steam to said superheater means.

12. Apparatus according to claim 1 wherein sid evaporator means, said superheater means, and said economizer means are separated each from the other, a conduit means interconnects said economizer means with said evaporator means for delivery of pre-heated feedwater to said evaporator means, and a conduit means interconnects said evaporator means with said superheater means for delivery of saturated steam to said superheater means.

13. A method for generating and reheating steam comprising:

a. flowing a heat supply fluid through a superheater in heat exchange relation with saturated steam to superheat the steam for delivery to a heat engine.

b. after the heat supply fluid has been flowed through the superheater, flowing the heat supply fluid through an evaporator in heat exchange relation with pre-heated water to form saturated steam for delivery to the superheater; and c. after the heat supply fluid has been flowed through the evaporator, flowing the heat supply fluid through both an economizer means and a reheater means in parallel flow to pre-heat feed water for delivery to the evaporator and to reheat steam exhausted from at least one heat engine for delivery to a lower pressure heat engine.

14. A method according to claim 13 further comprising imparting thermal energy from a nuclear reaction to the heat supply fluid.

15. A method according to claim 13 further comprising imparting thermal energy from a nuclear reaction to the heat supply fluid.

16. A method according to claim 13 wherein the step of flowing the heat supply fluid through the economizer and reheater means comprises flowing the heat supply fluid through both a secondary economizer, a second stage of a reheater for reheating exhaust steam from an intermediate pressure steam turbine for delivery to a low pressure steam turbine, and a reheater for reheating exhaust steam from a high pressure steam turbine for delivery to the intermediate pressure steam turbine in parallel flow; and thereafter flowing the heat supply fluid through both a primary economizer and a first stage of the reheater for reheating intermediate pressure steam turbine exhaust steam in parallel flow.

17. A method according to claim 16 further comprising imparting thermal energy from a nuclear reaction to the heat supply fluid.

* * * * *